Patented Mar. 18, 1930

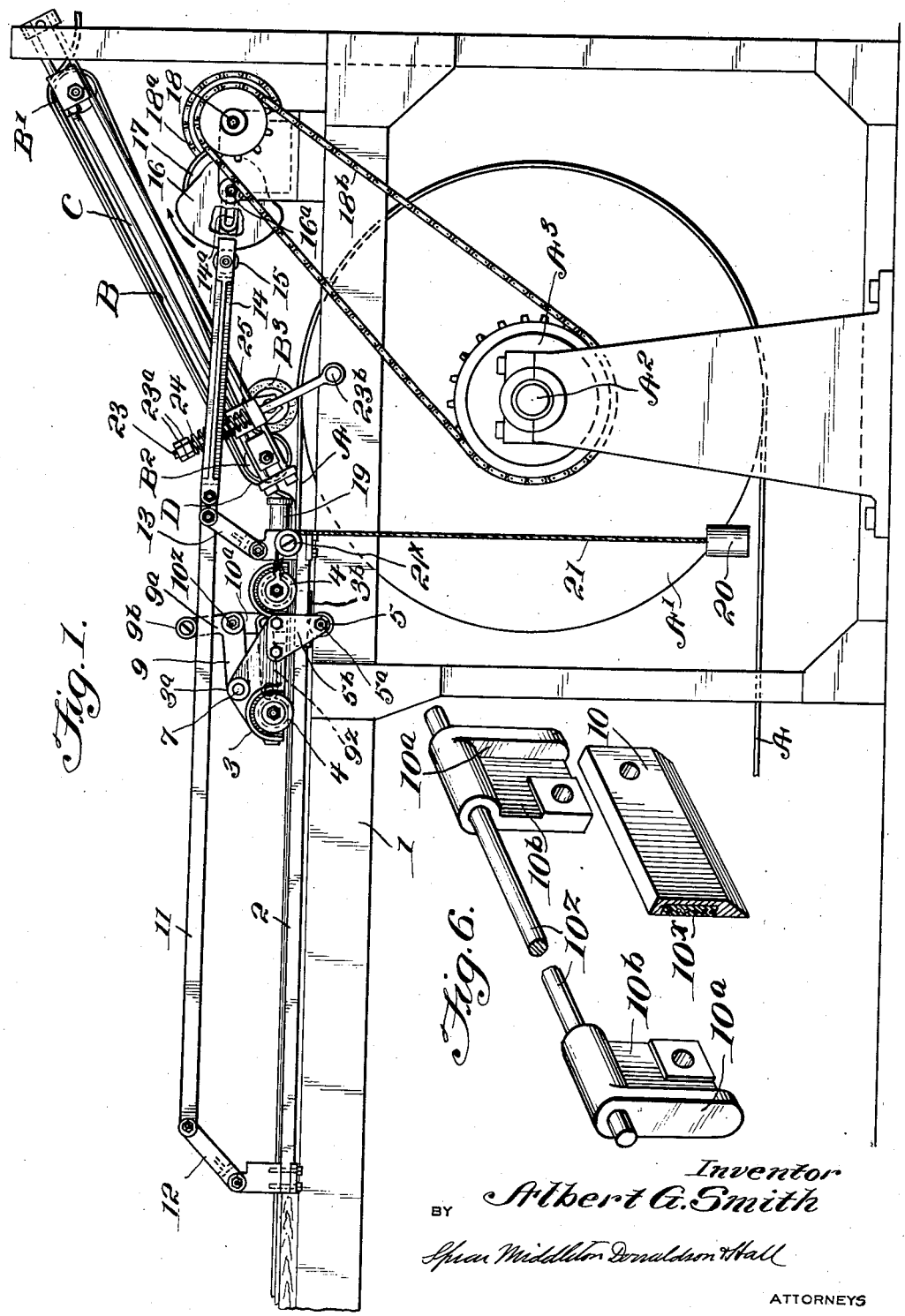

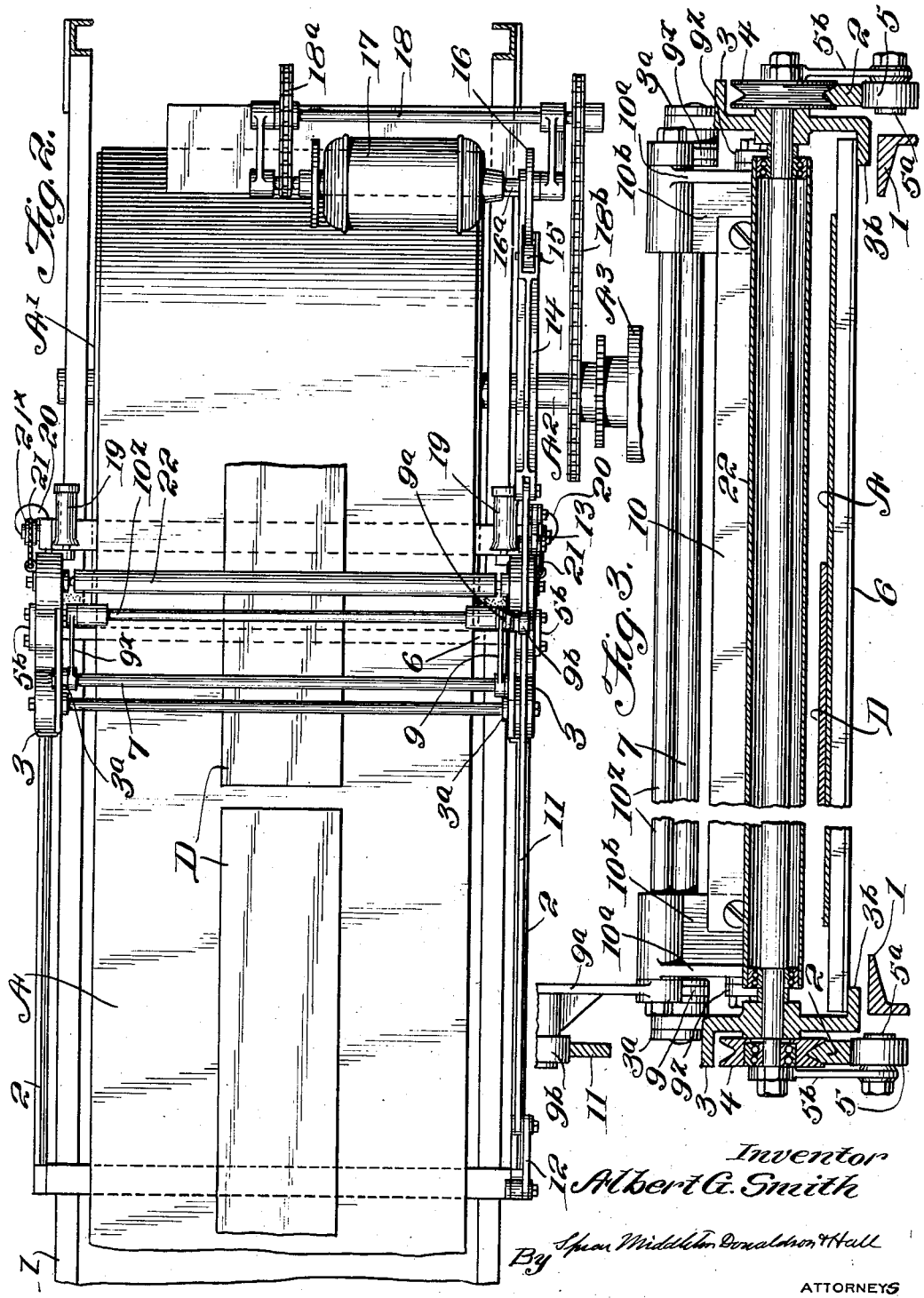

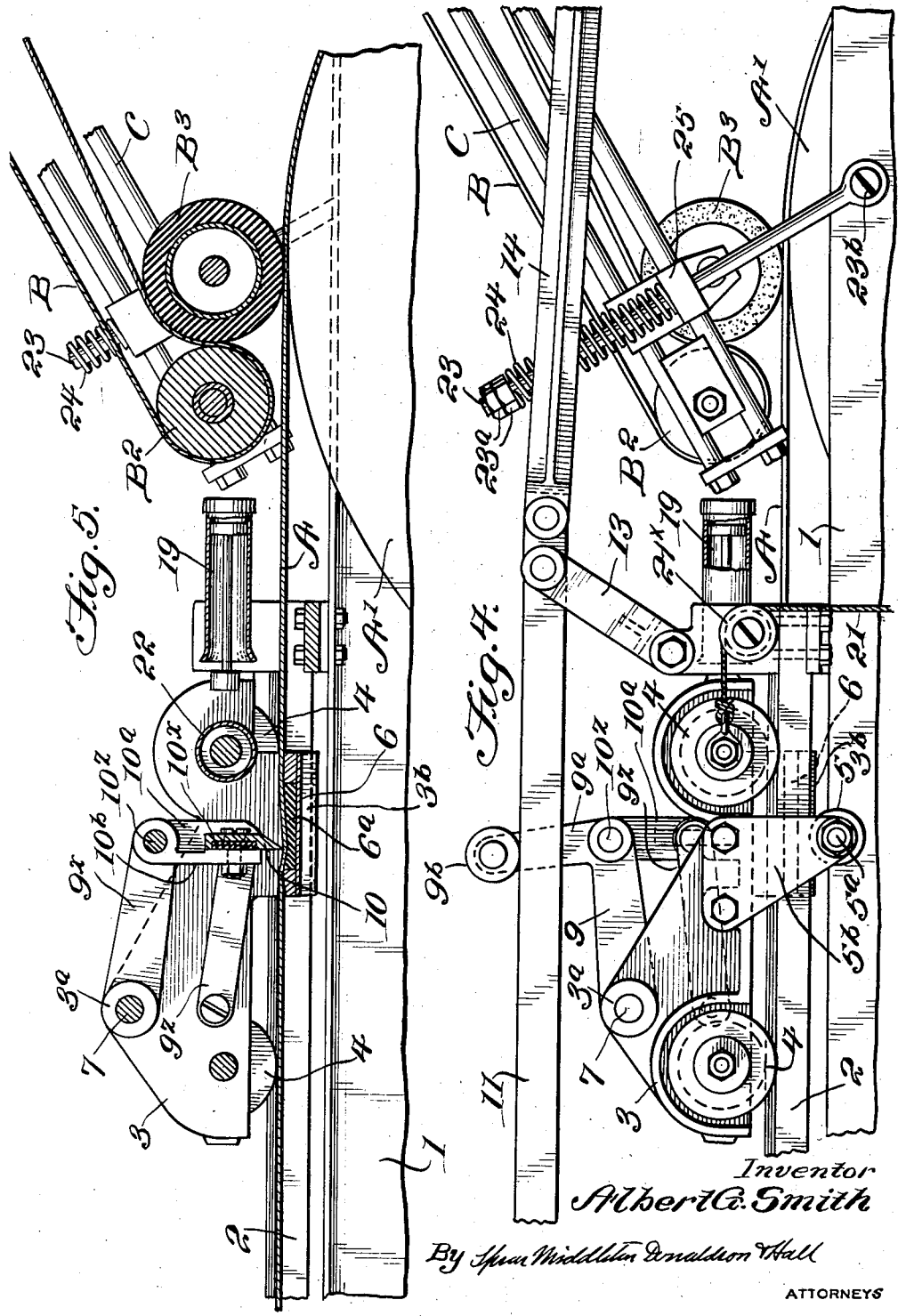

1,751,451

UNITED STATES PATENT OFFICE

ALBERT G. SMITH, OF AKRON, OHIO, ASSIGNOR TO THE MILLER RUBBER COMPANY, OF AKRON, OHIO, A CORPORATION OF OHIO

APPARATUS FOR PRODUCING SPACED BLANKS FROM A CONTINUOUSLY-MOVING PLASTIC SHEET

Application filed November 16, 1928. Serial No. 319,870.

The invention relates more specifically to means for producing from a continuously moving rubber sheet, such as is delivered from the ordinary calender, blanks suitable for forming rubber tubes by rolling on suitable mandrels, and conveying such blanks to an operator's station or stations.

The invention aims to provide a novel means by which the continuously moving sheet may be severed into blanks, conveyed to an operator's station, and during such conveyance have their severed ends spaced apart whereby each blank may be readily lifted from the conveyor without displacing or injuring the adjoining end of the next adjacent blank.

The invention further aims to provide a machine having, in connection with an endless traveling conveyor, a severing knife traveling with the conveyor, the traveling movement of the knife during the severing period being effected by the conveyor.

The invention further aims to provide a machine or apparatus for the purpose described which will be extremely economical, durable and efficient and which can be readily adjusted to sever the sheet into different lengths for producing different sized tubes.

With these and other objects in view which will be apparent from the subjoined description, the invention includes the novel apparatus hereinafter described and defined by the appended claims.

My novel apparatus is illustrated in the accompanying drawings in which:

Figure 1 is a side elevation of the machine or apparatus partly broken away.

Fig. 2 is a plan view with the feed belt omitted.

Fig. 3 is an enlarged longitudinal vertical sectional detail.

Fig. 4 is an enlarged detail view in side elevation, and

Fig. 5 is an enlarged longitudinal sectional detail.

Fig. 6 is a detail view.

The apparatus comprises a main endless conveyor A (preferably a canvas belt), and a feed conveyor B which receives the stock sheet D from the calender (not shown), and delivers it to the main conveyor A. The conveyor B comprises an endless canvas belt passing around rollers $B^1$ and $B^2$ and $B^3$, carried at opposite ends of a frame C which is located in inclined position and has its upper end fulcrumed on standards $1^a$ projecting upward from the main frame 1. The lower end of the frame is located so that the roller $B^3$ will rest upon the main belt A when it passes over the top of the driving drum $A^1$. The roller $B^2$ is arranged so as to cause an upward deflection of the belt B as clearly shown in Fig. 5, whereby increased traction effect between belt B and rollers $B^2$ and $B^3$ is secured, and in order to increase such traction effect between the rollers $B^2$ and $B^3$ and belt B and also between roller $B^3$ and belt A, the said roller $B^3$ is preferably provided with a rubber covering.

The lower end of the frame is yieldingly drawn downward to press the roller $B^3$ against belt A by springs 24 encircling rods 23 between the rod guides 25 on the frame C, and nuts $23^a$, the rods being pivotally connected to the main frame 1 at $23^b$.

The drum $A^1$ around which the main belt passes beneath the lower end of the belt B, may be driven in any suitable manner, as by means of belt pulley $A^3$, so as to drive the belt continuously at a substantially uniform rate of speed, such belt pulley being intended to be representative of any suitable drive means.

The longitudinal frame members 1 are provided with horizontal track rails 2 on which carriages 3 are designed to travel, the carriages being provided with grooved wheels 4, for engaging and running upon the tops of the rails which are of corresponding (reverse V) shape. Intermediate rollers 5 are provided beneath the rails to prevent the carriages from being accidentally displaced, these rollers being mounted on stub shafts $5^a$ carried by brackets $5^b$ secured to the carriage frames and depending therefrom.

Said carriage frames are provided at their bottom edges with inwardly turned flanges $3^b$ to which are secured the ends of a cross bar 6 (Fig. 3) which underlies the belt and serves as a platen member to sustain the belt against the downward pressure of the knife hereinafter described. The cross bar 6 is preferably of channel shape and provided with a cushion 6ª (Fig. 5), preferably of sponge rubber, to coact with the knife 10. The upper portions of the carriage frames carry journals 3ª for supporting a shaft 7 extending transversely above the belt. An angle lever or arm 9 (Fig. 4) has one end thereof fulcrumed on this shaft at one side of the machine, the intermediate or angle portion being operatively connected to an electrically heated knife 10 arranged directly above the cross bar or platen 6 and being supported and guided as hereinafter more specifically described.

The upwardly extending portion 9ª of the angle arm 9 carries a roller 9ᵇ arranged to travel upon a horizontal rail 11 which is vertically movable to raise the knife from and lower it towards the sheet.

Said knife 10 is pivotally carried by carrier members 10ª depending from shaft 10ᶻ which is carried by the arm 9 and a similar arm 9ˣ at the opposite ends of shaft 7, arms 9 and 9ˣ being fast on shaft 7. The carrier members 10ª are recessed as at 10ᵇ to receive the ends of the knife bar or blade 10, which is bolted thereto, and which is recessed to receive the electric resistance element indicated conventionally at 10ˣ.

The carrier members 10ª are fulcrumed on or pivotally connected to shaft 10ᶻ and hence will be moved vertically with shaft 10ᶻ under the action of arms 9 and 9ˣ as hereinafter described.

Swinging movement of the knife during its vertical movement is prevented by lower parallel links 9ᶻ articulated respectively to the carriage frames and knife carriers.

My preferred manner of supporting and operating the rail is to connect it at opposite ends to the main frame by parallel inclined links 12 and 13, so that longitudinal movement of the rail will swing the links and thus raise and lower the rail. This longitudinal movement is effected by a pitman 14 having a roller 15 actuated by a cam 16 fast on shaft 16ª which is driven by a variable speed device 17 (say of the Stephens-Adamson type), which in turn is driven through sprocket gearing 18ª from counter shaft 18 which receives its motion from sprocket gearing 18ᵇ and shaft A² of the main conveyor driving drum. Pitman 14 has a flattened extension provided with an elongated recess 14ª (Fig. 1), which is engaged by the shaft 16ª and serves as a guide for the pitman.

Movement of the carriages to the right, Fig. 1, is limited by stops 19, preferably of the dash pot type, while movement in the opposite direction is limited by weights 20 connected to cables 21ˣ passing over pulleys 22 and connected to the carriages, the weights serving to return the carriages to the initial position shown in Fig. 1 after they have moved with the conveyor belt during the severing operation.

According to my improved process, I feed the stock sheet to the conveyor belt in a warm condition, sever it while moving continuously into blanks, and separate the severed ends by shrinkage of the stock during its movement. The shrinkage may be effected by extending the conveyor sufficiently to allow the stock to cool during its travel which results in a separation of the severed ends, so that by the time the belt has reached a rolling table, the operators may readily remove the separated and spaced blanks.

The severing is effected in the following manner. With the parts in the position shown in Fig. 1, rotation of the cam 16 in the direction of the arrow will remove the high part from roller 15, allowing the pitman and rails (which are rigidly tied together by the cross rods), to move to the right by the action of gravity due to the inclined position of the links 12 and 13.

This lowers the bell crank link arrangement 9, 9ª, and 9ˣ, and the weight of the parts presses the knife down upon the stock sheet and clamps the sheet and belt between the knife and underlying platen bar, which causes the knife to move with the belt until the cam in its further rotation again actuates the pitman when the rails are raised, lifting the knife from the sheet, whereupon it is immediately returned to initial position by the weights 20 acting upon the carriages. The travel of the knife with the belt is for a distance sufficient to enable the knife to pass through the sheet and into contact with the belt by its melting action on the rubber. The rubber sheet, being warm, and being subjected to cooling while carried by the belts, is constantly shrinking, and this shrinking results in a shortening of the severed blanks and the separation of their ends sufficiently, by the time the rolling table is reached, to enable the operators to readily lift off the successive blanks without interference with following blanks.

Due to the constant shrinking of the stock while on the belts and the fact that belt B lies at an inclination to belt A, such shrinkage will cause the sheet of stock to have a tendency to be held up for a greater or less distance from conveyor A instead of dropping directly thereon after leaving conveyor B, which might result in contact, at times, of the sheet with the warm knife on return of the carriage with its elevated knife to its extreme right hand position. This undue raising of the sheet is prevented by the idle roller 22 (Figs. 1 and 5), which by reason of its being freely rotatable, offers no resistance to the travel of the stock relative thereto.

By adjusting the variable speed device, the speed of the cam relative to the conveyor belt may be readily changed, and thus longer or shorter blanks may be cut as desired without resort to changing cams, the operation being simply, quickly and accurately performed.

Having thus described my invention, what I claim is:

1. Apparatus for the purpose described comprising an endless carrier belt for sheet stock with means for imparting continuous movement thereto, and severing means for the stock comprising a platen beneath the belt and a knife movable towards and from the same, means whereby the movement of belt effects movement of the knife and platen when the belt and stock sheet are clamped between the knife and platen, and means for causing the knife and platen to travel in a direction contrary to that of the belt when the knife is elevated.

2. Apparatus for the purpose described comprising an endless carrier belt for sheet stock with means for imparting continuous movement thereto, and severing means for the stock comprising a platen beneath the belt and a knife movable towards and from the same, means whereby the movement of belt effects movement of the knife and platen when the belt and stock sheet are clamped between the knife and platen, and means for causing the knife and platen to travel in a direction contrary to that of the belt when the knife is elevated, and means for varying the speed of the belt.

3. Apparatus for the purpose described comprising an endless conveyor belt for sheet stock with means for continuously driving the same, carrier means supported to move in a rectilinear path adjacent the upper run of the belt, a platen member beneath said upper run and supported from said carrier, a sheet severing knife connected to said carriage and movable towards and from the belt, means for effecting movement of the knife into and out of contact with the belt and sheet carried thereby, and means for moving the carriage in a direction opposite to that of movement of the belt when the knife is elevated from the belt.

4. Apparatus for the purpose described comprising an endless conveyor belt for sheet stock with means for continuously driving the same, carrier means supported to move in a rectilinear path adjacent the upper run of the belt, and including a platen bar underlying the belt, severing means carried by said carriage and vertically movable relative thereto, an elevated horizontal rail, inclined links supporting said rail, means connected with said knife and having sliding connection with the rail, means for imparting endwise movement to the rail, and yielding means tending to move the carrier means towards the initial end of the apparatus.

5. Apparatus according to claim 4 in which the means for imparting longitudinal movement to the rail comprises a pitman, and a cam for actuating the same.

6. Apparatus according to claim 4 in which the means for imparting longitudinal movement to the rail comprises a cam, and means for varying the speed of the cam.

7. Apparatus for the purpose described comprising an endless conveyor belt for sheet stock with means for continuously driving the same, tracks adjacent the upper run of the conveyor, connected carriages arranged to travel on said tracks, a platen bar supported by said carriages beneath the said run of the belt, a knife carrier supported by said carriages for substantially rectilinear vertical movement, a horizontal rail mounted for bodily vertical movement, means for raising and lowering said rail, and means for returning the carriage to initial position.

8. Apparatus for the purpose described comprising an endless conveyor belt for sheet stock with means for continuously driving the same, tracks adjacent the upper run of the belt, connected carriages arranged to travel on said tracks, a platen bar beneath the belt supported by the carriages, a knife carrier above the belt and opposed to said platen bar, pairs of parallel links connecting the knife carrier to the carriages, a horizontal rail above one of said carriages, means slidably connecting the knife carrier with said rail, means for raising and lowering the rail, and yielding means tending to move the carriages towards the initial end of the apparatus.

9. Apparatus for the purpose described comprising an endless conveyor belt for sheet stock with means for continuously driving the same, tracks adjacent the upper run of the belt, connected carriages arranged to travel on said tracks, a platen bar beneath the belt supported by the carriages, a knife carrier above the belt and opposed to said platen bar, pairs of parallel links connecting the knife carrier to the carriages, a horizontal rail above one of said carriages, inclined parallel links connecting said rail to the machine frame, means slidably connecting the knife carrier with the rail, means for imparting lengthwise movement to the rail, and yielding means tending to urge the carriages towards the initial end of the machine.

10. Apparatus for the purpose described comprising an endless conveyor belt for sheet stock with means for continuously driving the same, tracks adjacent the upper run of the belt, connected carriages arranged to travel on said tracks, a platen bar beneath the belt supported by the carriages, a knife carrier above the belt and opposed to said platen bar, pairs of parallel links connecting the knife carrier to the carriages, a cross shaft rigidly connecting the upper of the pairs of links, a horizontal rail disposed adjacent one of the carriages, an arm carried by one of the links and having a part slidably engaging the rail, means for raising and lowering the rail, and means for moving the carriages towards the feed end of the apparatus.

In testimony whereof, I affix my signature,

ALBERT G. SMITH.